July 27, 1948.  E. H. LOESSEL ET AL  2,446,052
COMPARATOR FOR COLOR PHOTOGRAPHS
Filed April 26, 1945
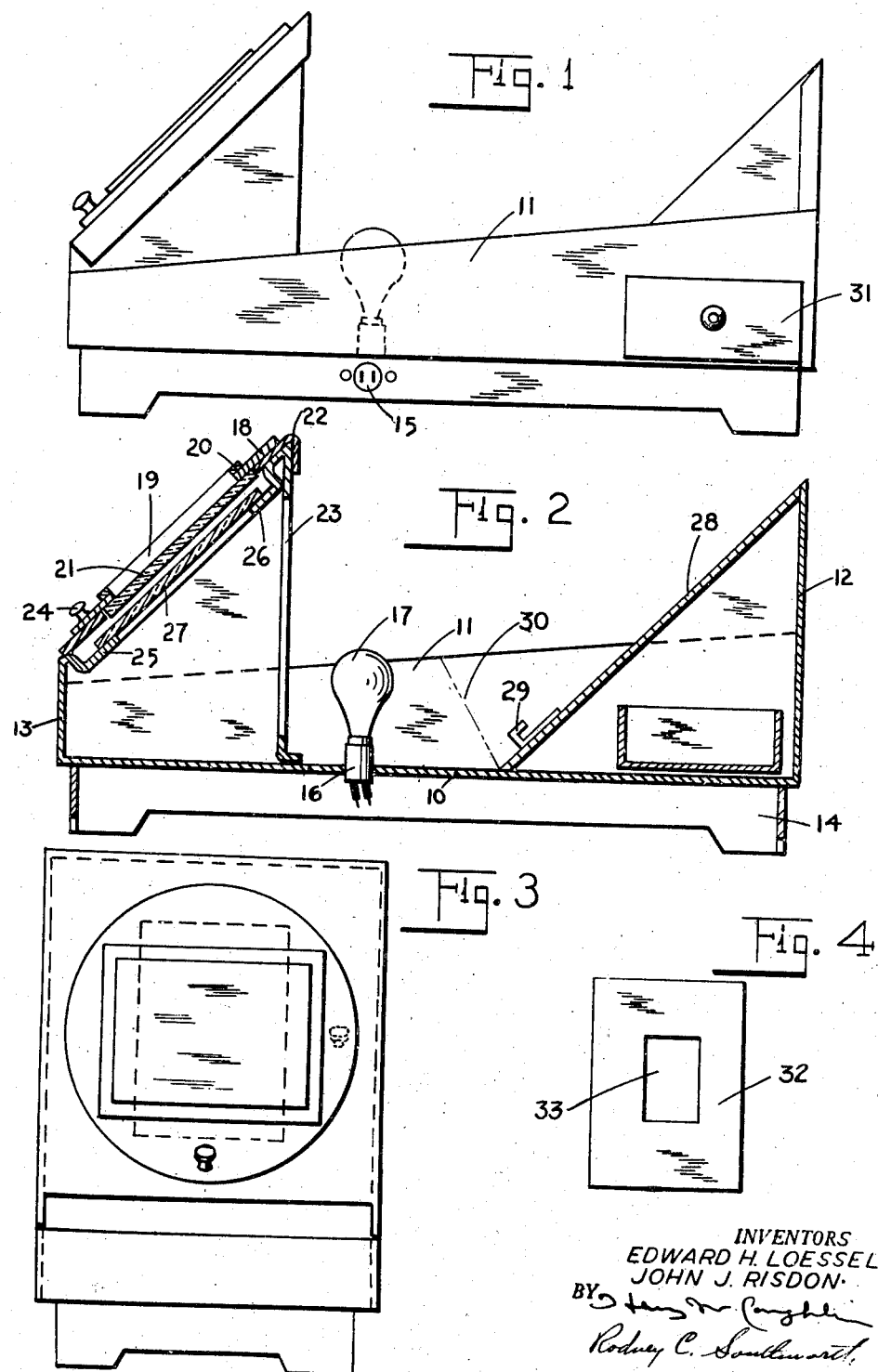
INVENTORS
EDWARD H. LOESSEL
JOHN J. RISDON.
BY
ATTORNEYS Patented July 27, 1948

2,446,052

UNITED STATES PATENT OFFICE 2,446,052

COMPARATOR FOR COLOR PHOTOGRAPHS

Edward H. Loessel and John J. Risdon, Binghamton, N. Y., assignors to General Aniline & Film Corporation, New York, N. Y., a corporation of Delaware Application April 26, 1945, Serial No. 590,356

5 Claims. (Cl. 88—14)

This disclosure pertains to an invention in a viewer or comparator for use in comparing color transparencies and color prints made from them. It is well known that a transparency must be observed by positioning it relatively to a light source so that light comes through the picture to the eye of the observer. Of course, a print which is relatively opaque must be viewed by reflected light. Since the transparency generally shows the scene in its true colors or as nearly in its colors as is practically possible, the print made therefrom should be compared with the transparency and for best results, the colors of the print should closely simulate those of the transparency. In following that procedure, it is highly desirable that the transparency and the print made therefrom be compared or viewed in the same light, that is, the same both as to intensity of illumination and the spectral composition or color temperature of the light.

It is one of the objects of the invention to provide a simple and effective viewer or comparator in which both a transparency and a print made therefrom may be viewed under light conditions such as are desired for the purpose and in which both may be viewed more or less simultaneously. Another object of the invention is to provide a device in which stray light rays or reflected light shall not adversely affect the colors of either the transparency or the print. That is, it is desired to provide a viewer in which the nearest approach to theoretically ideal conditions is realized, for both the picture illuminated by the transmitted light and that illuminated by the reflected light. It is another object of the invention to provide a simple, inexpensive and compact unit which will accommodate transparencies and prints of a wide variety of sizes without resort to adjustments or additional mechanism other than a plurality of separate masking cards, one for each standard size of transparency.

Other objects of the invention will be apparent as the disclosure progresses. One specific embodiment illustrated in the accompanying figures of drawing is taken as an example of a preferred form which the invention may embrace. This disclosure is not to be considered as limiting the invention, the principles of which may be applied in various forms and modifications. In the figures of drawing:

Fig. 1 is a side elevation of the device.

Fig. 2 is a longitudinal vertical section taken along the center of the comparator of Fig. 1.

Fig. 3 is a front view of the device; and

Fig. 4 shows in detail one of the masks for a transparency of smaller size.

Now, referring to Figs. 1, 2 and 3, the instrument comprises among other parts a bottom 10, side pieces 11, a back 12 and the front wall 13. These may be of thin sheet metal, of wooden construction or of any other material suitable for the purpose. Preferably, the instrument is made up from sheet metal and is fabricated by forming the sheets into the proper shape and spot welding them. Of course, other means of fabrication will be apparent and the material and method by which the instrument is made will depend largely upon the cost and practical factors.

The entire instrument is supported by a base 14 into one side of which is built an electrical connection 15 by which it may be connected through a suitable cord and switch to any ordinary source of current. Current is then conducted through suitable wires to a socket 16 projecting upwardly through the bottom of the instrument and into which may be inserted a light bulb 17. For most purposes, a tungsten type bulb of about 100 watts will be found satisfactory. Of course, the source of light may be changed for different purposes.

At the front of the comparator, the transparency (not shown) is inserted in a holder or receiver which is constituted as a circular plate 18 having a rectangular opening 19 at its center, the depth of this opening being accentuated by a similar rectangular ridge 20. Beneath the rectangular opening is mounted a ground glass 21 against which the transparency rests and through which light from the source 17 passes in illuminating that transparency. This glass 21 is circular in outline and serves as a sort of bearing upon which the transparency support may be rotated since the glass 21 fits within a similar circular opening in the plate 22 which is supported by the front wall 13 and also by an intermediate wall 23 which is open at most of its center portion so as to allow light from the source 17 to reach practically all of the space between walls 13 and 23. A knob 24 may be used in turning or rotating the transparency holder from the full line position, Fig. 3, to the dotted line position therein. Rotation of 90° is sufficient for viewing either vertically or horizontally disposed scenes.

The front wall 13 is bent inwardly and downwardly as at 25 while the upper end of wall 23 is similarly formed at 26. That provides for supporting an opal glass 27 by means of which the light is diffused so as to illuminate the transparency more evenly.

An inclined plate 28 extends from the bottom 10 to the top of the rear wall 12. Adjacent the lower end of that plate is a hooked support 29 into which the lower edge of the print to be viewed is inserted. The plate 28 and the transparency holder are inclined as shown and substantially parallel, although not necessarily exactly parallel. The proportions of these parts and the angle at which they are placed are such that when in position to view the transparency, the observer's eye will also be in line to compare the print with the transparency by merely glancing upwardly and over the top of the plate 22. These parts are also so disposed that no reflections from the light source or from the print other than the reflected light necessary to observe the print itself come to the eye of the observer. To that end, the part of the instrument seen by looking above the top of plate 22 is finished in dull black and is formed with a matte surface. The inner part of the front of the instrument is finished in white so as to reflect the light from all angles up to the opal glass 27, and also so as to reflect as much of the light as possible back toward the print itself. That assures even illumination of the transparency and also maintains the intensity of illumination on the print so that with the light source about midway of the space between the transparency and print, each will be lighted with substantially the same intensity. The dot and dash line 30 marks the point of division between the black and white interior finishes.

While it is not a necessary part of the invention, a drawer 31 is provided within the triangular space at the back of the instrument and that serves as a place to keep a number of masks, one of which is illustrated at 32, Fig. 4. These masks may be cut from cardboard or other suitable material and have outside dimensions such that they fit within the rectangular opening 19. An inner rectangular opening 33 is of correct size to accommodate the particular size of transparency for which the mask is adapted. One practical sized instrument has a rectangular opening 19 for 5 x 7 transparencies while the largest print adapted to be accommodated is an 8 x 10. For such an instrument, a number of masks accommodate all other sizes down to the smallest. Generally the smallest size transparency is the 24 x 36 mm. size and since they are frequently mounted in holders or slides, one most useful mask will be adapted to take the standard 35 mm. slide.

The use of the instrument is quite apparent, it merely being necessary to place the print against the inclined plate 28 with its lower edge held by the hooked support 29 and to insert the transparency within a properly sized mask and then place the mask in the rectangular opening 19 at the front of the instrument. Of course, the holder for the transparency is to be rotated to that position in which the image is upright. When the source of light is turned on, both will be illuminated with substantially even intensity and with the same quality of light.

By way of modification, the base 14 may be varied or may be dispensed with altogether. If the drawer 31 is not provided, the plate 28 may be welded or otherwise attached to the sides and thus the back 12 need not be employed. Likewise, front wall 13 may merely become an inclined portion of the transparency supporting plate.

While one embodiment of the invention has been disclosed, it is to be understood that the inventive concept may be carried out in a number of ways. This invention is, therefore, not to be limited to the precise details described, but is intended to cover all variations and modifications thereof falling within the spirit of the invention and the scope of the claims.

We claim:

1. A comparator for viewing color transparencies and prints made therefrom including in combination a supporting structure, a light source intermediate the ends of said structure, an inclined plate extending upwardly and back from one end of the supporting structure, a holder for supporting a color transparency carried by said inclined plate, both the plate and holder being disposed normally to the direction of light from the source and having therein openings coextensive with the transparency to be viewed and through which light from the source illuminates the transparency, a second inclined plate adjacent the other end of said structure and means thereon for supporting a print in such position as to be lighted by said source with substantially the same intensity of illumination as the transparency, and light diffusing means between the source of illumination and the transparency holder, substantially parallel to the holder and plate and of such extent that light from the source to the transparency is diffusely transmitted thereby.

2. A comparator for viewing color transparencies and prints made therefrom including in combination a supporting structure having a bottom, sides, and back and front walls, a light source intermediate the ends of said structure, an inclined plate extending upwardly and back from one end of the supporting structure, a holder for supporting a color transparency carried by said inclined plate, both the plate and holder being disposed normally to the direction of light from the source and having therein openings coextensive with the transparency to be viewed and through which light from the source illuminates the transparency, a second inclined plate adjacent the other end of said structure and means thereon for supporting a print in such position as to be lighted by said source with substantially the same intensity of illumination as the transparency, and light diffusing means between the source of illumination and transparency holder, substantially parallel to the holder and plate and of such extent that light from the source to the transparency is diffusely transmitted thereby.

3. A comparator for viewing color transparencies and prints made therefrom including in combination a supporting structure having a bottom, sides, and back and front walls, a light source intermediate the ends of said structure, an inclined plate extending upwardly and back from one end of the supporting structure, a holder for supporting a color transparency carried by and rotatable within said inclined plate, both the plate and holder being disposed normally to the direction of light from the source and having therein openings coextensive with the transparency to be viewed and through which light from the source illuminates the transparency, a second inclined plate adjacent the other end of said structure and means thereon for supporting a print in such position as to be lighted by said source with substantially the same intensity of illumination as the transparency, and light diffusing means between the source of illumination and the transparency holder, substantially parallel to the holder and plate and of such extent that light from the source to the transparency is diffusely transmitted thereby.

4. A comparator for viewing color transparencies and prints made therefrom including in combination a supporting structure having a bottom, sides, and back and front walls, a light source intermediate the ends of said structure, an inclined plate extending upwardly and back from one end of the supporting structure, a holder for supporting a color transparency carried by said inclined plate, the said holder being rotatable within the plate and both the plate and holder being disposed normally to the direction of light from the source and having therein openings coextensive with the transparency to be viewed and through which light from the source illuminates the transparency, a second inclined plate adjacent the other end of said structure and means thereon for supporting a print in such position as to be lighted by said source with substantially the same intensity of illumination as the transparency, and light diffusing means between the source of illumination and the transparency holder and substantially parallel to the holder and plate including an opal glass and a ground glass screen of such extent that light from the source to the transparency is diffusely transmitted thereby.

5. A comparator for viewing color transparencies and prints made therefrom including in combination a supporting structure having a bottom, sides, and back and front walls, a light source intermediate the ends of said structure, an inclined plate extending upwardly and back from one end of the supporting structure and the said front wall, a holder for supporting a color transparency carried by said inclined plate and having therein a rectangular opening for receiving the transparency, both the plate and holder being disposed normally to the direction of light from the source, the plate having therein an opening larger than the opening in the holder thereby to permit light from the source to illuminate the transparency, a second inclined plate adjacent the other end of said structure and hooked means at the base of said plate for retaining a print in such position as to be lighted by said source with substantially the same intensity of illumination as the transparency, a light diffusing means between the source of illumination and the transparency holder including a ground glass screen covering the rectangular opening in the holder and an opal glass overlying the opening in the plate, that portion of the supporting structure adjacent the print holder plate being finished as a non-reflecting surface and the remainder of the interior of the supporting structure and the inner surface of the transparency holding portion of the comparator being finished as a reflecting surface.

EDWARD H. LOESSEL.
JOHN J. RISDON.

REFERENCES CITED

The following references are of record in the file of this patent:

UNITED STATES PATENTS

| Number | Name | Date |
| --- | --- | --- |
| 1,802,007 | Durfee | Apr. 21, 1931 |